United States Patent
Hwangbo et al.

(10) Patent No.: US 11,993,221 B2
(45) Date of Patent: May 28, 2024

(54) SEAT AIRBAG APPARATUS FOR VEHICLE

(71) Applicant: HYUNDAI MOBIS CO., LTD., Seoul (KR)

(72) Inventors: Sang Won Hwangbo, Yongin-si (KR); Dong Young Kim, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/944,320

(22) Filed: Sep. 14, 2022

(65) Prior Publication Data
US 2023/0106061 A1    Apr. 6, 2023

(30) Foreign Application Priority Data
Oct. 5, 2021   (KR) .................... 10-2021-0131893

(51) Int. Cl.
*B60R 21/233* (2006.01)
*B60R 21/239* (2006.01)
*B60R 21/231* (2011.01)
*B60R 21/235* (2006.01)

(52) U.S. Cl.
CPC .......... *B60R 21/233* (2013.01); *B60R 21/239* (2013.01); *B60R 2021/23146* (2013.01); *B60R 2021/23538* (2013.01)

(58) Field of Classification Search
CPC ............... B60R 21/233; B60R 21/239; B60R 2021/23146; B60R 2021/23538
See application file for complete search history.

(56) References Cited

U.S. PATENT DOCUMENTS

| | | | |
|---|---|---|---|
| 2017/0349134 A1* | 12/2017 | Kwon | B60R 21/239 |
| 2021/0261086 A1* | 8/2021 | Kobayashi | B60R 21/239 |
| 2023/0064279 A1* | 3/2023 | Ohno | B60R 21/231 |

FOREIGN PATENT DOCUMENTS

| | | | | |
|---|---|---|---|---|
| EP | 3511208 B1 * | 2/2021 | ........... | B60R 21/207 |
| KR | 10-2020-0121392 A | 10/2020 | | |

* cited by examiner

*Primary Examiner* — Jason D Shanske
*Assistant Examiner* — Matthew James O'Neill
(74) *Attorney, Agent, or Firm* — Novo TechIP International PLLC

(57) ABSTRACT

The present invention relates to a seat airbag apparatus for a vehicle, in which a raw cushion fabric 210 provided in the form of a single flat panel is coupled by sewing to an inner cushion part 110 provided in the form of a flat panel, and a front cushion 200 is formed by using the raw cushion fabric 210 provided in the form of a flat panel. Therefore, the sewing coupling may be easily and smoothly performed, and particularly the tolerance in respect to the sewing coupling may be reduced, thereby improving quality.

8 Claims, 8 Drawing Sheets

SEAT AIRBAG APPARATUS FOR VEHICLE

CROSS-REFERENCE TO RELATED APPLICATIONS

The present application claims the benefit of priority to Korean Patent Application No. 10-2021-0131893, filed Oct. 5, 2021, the disclosure of which is incorporated herein by reference in its entirety.

TECHNICAL FIELD

The present invention relates to a seat airbag apparatus for a vehicle, and more particularly, to a technology related to an airbag apparatus for a vehicle seat, which may effectively restrict all a lateral movement, a forward movement, and a diagonal movement of a passenger by using a lateral cushion configured to be deployed from a seatback and a front cushion extending from the lateral cushion.

BACKGROUND

An autonomous vehicle refers to a smart vehicle to which an autonomous driving technology is applied so that the vehicle autonomously arrives at a destination even though a driver does not directly manipulate a steering wheel, an accelerator pedal, and a brake pedal. Recently, the autonomous vehicle is actively developed.

In a case in which autonomous driving is universally implemented, the driver may select a relaxed mode in which the driver may take a rest without directly driving the vehicle while the vehicle travels. In the relaxed mode, a movement, a rotation, and a posture of a seat may be variously changed to meet the passenger's request.

In the case in which the passenger's seating conditions are variously changed in an autonomous driving situation as described above, only an airbag apparatus provided in a vehicle in the related art cannot effectively restrict the passenger's movement in the event of an accident.

Therefore, there is a need for an airbag apparatus having a new concept suitable for an autonomous vehicle. For example, there has been developed a seat airbag apparatus that may effectively restrict all a lateral movement, a forward movement, and a diagonal movement of a passenger by using a lateral cushion configured to be deployed forward from a seatback and a front cushion configured to be deployed toward a front side of the passenger from the lateral cushion, thereby further improving an effect of protecting the passenger.

However, in the case of the seat airbag apparatus in the related art, the front cushion is deployed while being bent from the lateral cushion or the front cushion having a cylindrical shape is coupled to the lateral cushion by sewing. In the case of the structure in which the front cushion is deployed while being bent from the lateral cushion, there are problems in that the front cushion is hardly deployed by being bent by 90 degrees in accordance with the intention, and particularly, airbag gas cannot be smoothly transmitted to the front cushion because of the structure in which the front cushion is bent.

Further, in the case of the structure in which the front cushion having a cylindrical shape is coupled to the lateral cushion by sewing, the cylindrical front cushion is coupled to the lateral cushion by sewing after a coupled portion between the cylindrical front cushion and the lateral cushion is bent outward. However, the sewn portion of the front cushion bent outward is not uniform, which makes it difficult to apply uniform sewing to a predetermined position of the lateral cushion. For this reason, it is difficult to maintain a constant sewing interval, which makes it difficult to manufacture the airbag apparatus. In particular, tolerance in respect to the sewing is high, which may degrade quality.

The foregoing explained as the background is intended merely to aid in the understanding of the background of the present invention, and is not intended to mean that the present invention falls within the purview of the related art that is already known to those skilled in the art.

SUMMARY

The present invention is proposed to solve these problems and aims to provide a seat airbag apparatus for a vehicle, which may effectively restrict all a lateral movement, a forward movement, and a diagonal movement of a passenger by using a lateral cushion configured to be deployed forward from a seatback and a front cushion configured to be deployed toward a front side of the passenger from the lateral cushion. Further, the present invention also aims to more smoothly transmit airbag gas to the front cushion by improving efficiency in manufacturing the lateral cushion and the front cushion. Further, the present invention also aims to improve quality by reducing tolerance in respect to a process of sewing the lateral cushion and the front cushion.

An embodiment of the present invention provides a seat airbag apparatus for a vehicle, the seat airbag apparatus including: a lateral cushion manufactured as an inner cushion part, which is disposed toward a passenger, and an outer cushion part, which is disposed outward, are superimposed and an outer periphery of the inner cushion part and an outer periphery of the outer cushion part are coupled by sewing; and a front cushion manufactured as a raw cushion fabric provided in the form of a single panel is folded in a pocket shape and an outer periphery of the raw cushion fabric is sewn, in which the lateral cushion and the front cushion are coupled to each other, and an interior of the lateral cushion and an interior of the front cushion are connected to each other so that airbag gas is transmitted.

The lateral cushion and the front cushion may be connected through a vent hole, and the lateral cushion and the front cushion may be coupled to each other as an outer periphery of the vent hole is sewn.

An inner cushion part hole may be formed in a front portion of the inner cushion part, a raw cushion fabric hole may be formed in the raw cushion fabric, and a vent hole, which connects the lateral cushion and the front cushion, may be defined as the inner cushion part hole and the raw cushion fabric hole are connected to each other.

An inner cushion part hole may be formed in a front portion of the inner cushion part, a raw cushion fabric hole may be formed in the raw cushion fabric, and a vent hole, which connects the lateral cushion and the front cushion, may be defined as the inner cushion part hole and the raw cushion fabric hole are connected to each other when the inner cushion part and the raw cushion fabric are superimposed.

The inner cushion part and the raw cushion fabric may be coupled to each other as an outer periphery of the vent hole is sewn, the front cushion may be formed as the raw cushion fabric coupled to the inner cushion part is folded in a pocket shape and an outer periphery of the raw cushion fabric is sewn, and the lateral cushion may be formed as the outer cushion part is superimposed on the inner cushion part and an outer periphery of the inner cushion part and an outer periphery of the outer cushion part are supplied by sewing after the front cushion is formed by using the raw cushion fabric.

A tether may be connected to cross the vent hole so that the vent hole is prevented from being enlarged when airbag gas is transmitted.

The vent hole may be provided as two or more vent holes, and a connection portion between the vent holes may prevent the vent hole from being enlarged when airbag gas is transmitted.

According to the seat airbag apparatus for a vehicle according to the present invention described above, the lateral cushions are deployed while protruding forward from the seatback to protect the lateral sides of the passenger, and the front cushions are deployed while protruding toward the front side of the passenger from the lateral cushions to protect the front side of the passenger. The seat airbag apparatus may be applied to the autonomous vehicle in which the movement and rotation of the seat and the passenger's seating conditions are variously changed. In particular, it is possible to more effectively protect the passenger in the autonomous vehicle.

In addition, according to the embodiment of the present invention, the raw cushion fabric provided in the form of a single flat panel is coupled by sewing to the inner cushion part provided in the form of a flat panel, and the front cushion is formed by using the raw cushion fabric provided in the form of a flat panel. Therefore, the sewing coupling may be easily and smoothly performed, and particularly the tolerance in respect to the sewing coupling may be reduced, thereby improving quality.

In addition, according to the present invention, since the structure in which the lateral cushion and the front cushion are connected to each other is made by sewing the raw cushion fabric and the inner cushion part, it is possible to solve a structural problem in that the front cushion is deployed while being bent from the lateral cushion. Therefore, the airbag gas may be smoothly transmitted to the front cushion, thereby improving performance in deploying the cushion.

DETAILED DESCRIPTION

Figure 1:
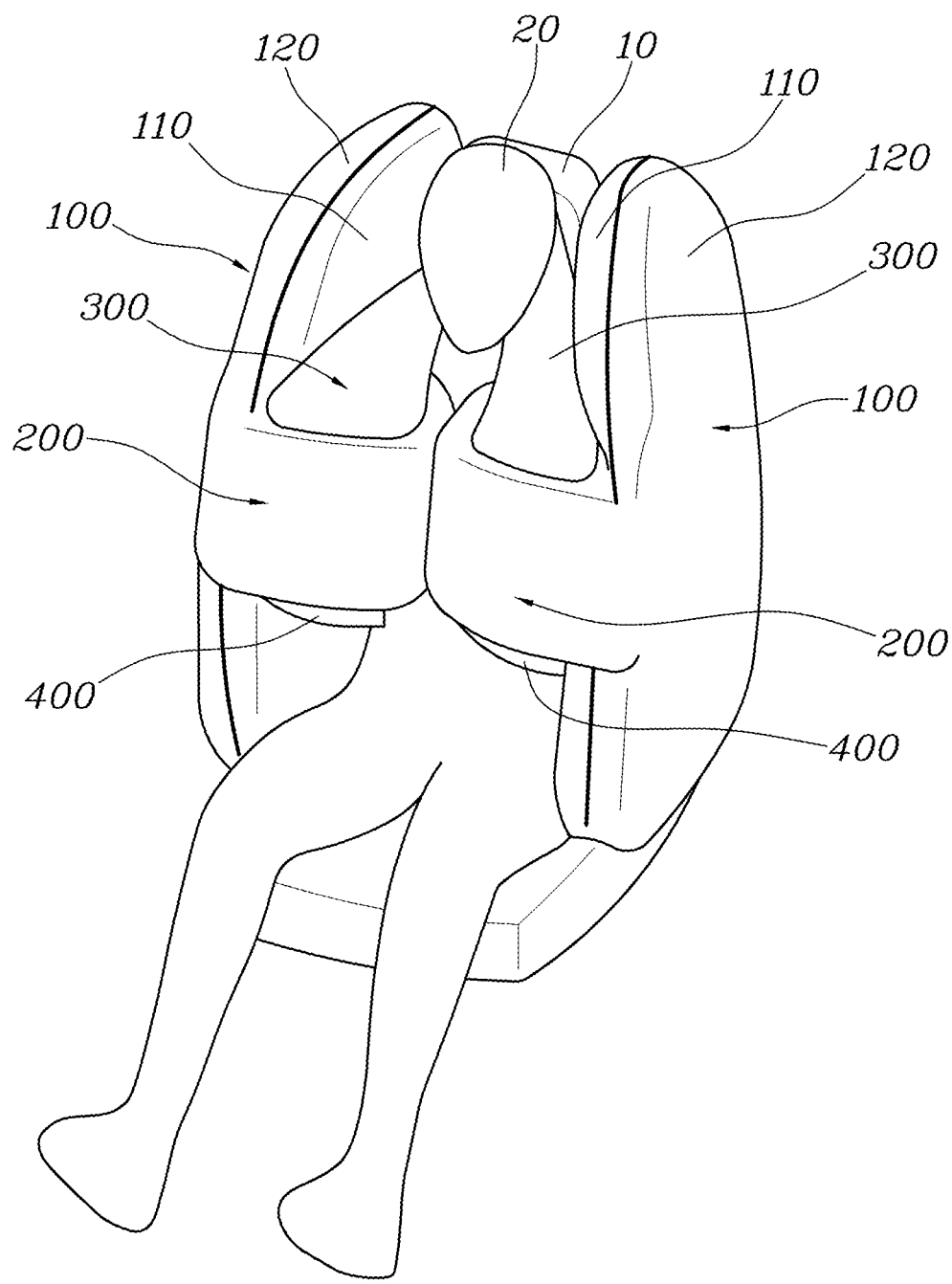
FIG. 1 is a perspective view illustrating a state in which a seat airbag apparatus for a vehicle according to the present invention is deployed.

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used only for the purpose of describing particular embodiments and are not intended to limit the present invention. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present specification.

A control unit (controller) according to an exemplary embodiment of the present invention may be implemented by a non-volatile memory (not illustrated) configured to algorithm for controlling operations of various constituent elements in a vehicle or store data related to software commands for executing the algorithm, and by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

Hereinafter, a seat airbag apparatus for a vehicle according to an exemplary embodiment of the present invention will be described with reference to the accompanying drawings.

As illustrated in FIGS. 1 to 7, a seat airbag apparatus for a vehicle according to the present invention includes: lateral cushions 100 configured to be deployed while protruding forward from a seatback 10 constituting a seat of a vehicle, the lateral cushions 100 being configured to cover and protect lateral sides of a passenger 20 seated in the seat after being deployed; and front cushions 200 configured to be deployed while protruding toward a front side of the passenger 20 from the lateral cushions 100, the front cushions 200 being configured to cover and protect the front side of the passenger 20 after being deployed.

The lateral cushions 100 and the front cushions 200 are respectively provided to be symmetrical vertically with respect to the seatback 10.

In addition, the seat airbag apparatus according to the present invention includes: upper tethers 300 configured to connect an upper end of the seatback 10 and the lateral cushions 100 and the front cushions 200, the upper tethers 300 being configured to restrict the deployment of the lateral cushion 100 and the deployment of the front cushion 200 by being deployed in a flat shape with a predetermined size when the lateral cushions 100 and the front cushions 200 are deployed; and lower tethers 400 coupled to connect a lower end of the seatback 10 and the front cushions 200, the lower tethers 400 being configured to restrict the deployment of the front cushion 200 by being deployed in a flat shape with a predetermined size when the front cushion 200 is deployed in order to prevent the front cushions 200 from lifting.

The upper tethers 300 and the lower tethers 400 are respectively provided to be symmetrical vertically with respect to the seatback 10.

According to the seat airbag apparatus according to the present invention, the lateral cushions 100 are deployed to protrude from the seatback 10 first, and then continuously, the front cushions 200 are deployed and unfolded from the lateral cushions 100. Therefore, the seat airbag apparatus with this configuration may enable the seat to move and rotate and particularly may be appropriately used for an autonomous vehicle in which the passenger's seating conditions are variously changed.

In addition, in the embodiment according to the present invention, the tether for restricting the deployment of the lateral cushion 100 and the deployment of the front cushion 200 is a surface tether having a predetermined area instead of a general tether having a strap shape. As necessary, dual surface tether structures are applied to upper and lower ends of the tether, such that the tether may restrict the deployment of the lateral cushion 100 and the deployment of the front cushion 200 by using a high restrictive force. Therefore, the airbag apparatus may effectively restrict the lateral movement, the forward movement, and the diagonal movement of the passenger, thereby further improving the effect of protecting the passenger. As a result, it is possible to maximally reduce a degree of injury to the passenger in the event of an accident.

The lateral cushion 100 according to the present invention includes an inner cushion part 110 (i.e., inner cushion) having an inner surface configured to face the passenger when deployed, and an outer cushion part 120 having an inner surface configured to face an outer surface of the inner cushion part 110 when deployed. The lateral cushion 100 is manufactured as outer peripheries of the inner and outer cushion parts 110 and 120 are coupled by sewing in a state in which the inner and outer cushion parts 110 and 120 are superimposed.

The front cushion 200 according to the present invention is manufactured by folding, in a pocket shape, a raw cushion fabric 210 provided in the form of a single panel, and then sewing an outer periphery of the raw cushion fabric 210.

Further, the lateral cushion 100 and the front cushion 200 are coupled to each other, and an interior or inner space of the lateral cushion 100 and an interior or inner space of the front cushion 200 are connected to each other to transmit airbag gas.

A process of manufacturing a seat airbag cushion will be described more specifically with reference to FIGS. 2 to 5.

The lateral cushion 100 includes the inner cushion part 110 disposed toward the passenger based on a deployed state, and the outer cushion part 120 disposed outward. The front cushion 200 is manufactured by using the raw cushion fabric 210 provided in the form of a single panel.

Figure 2:
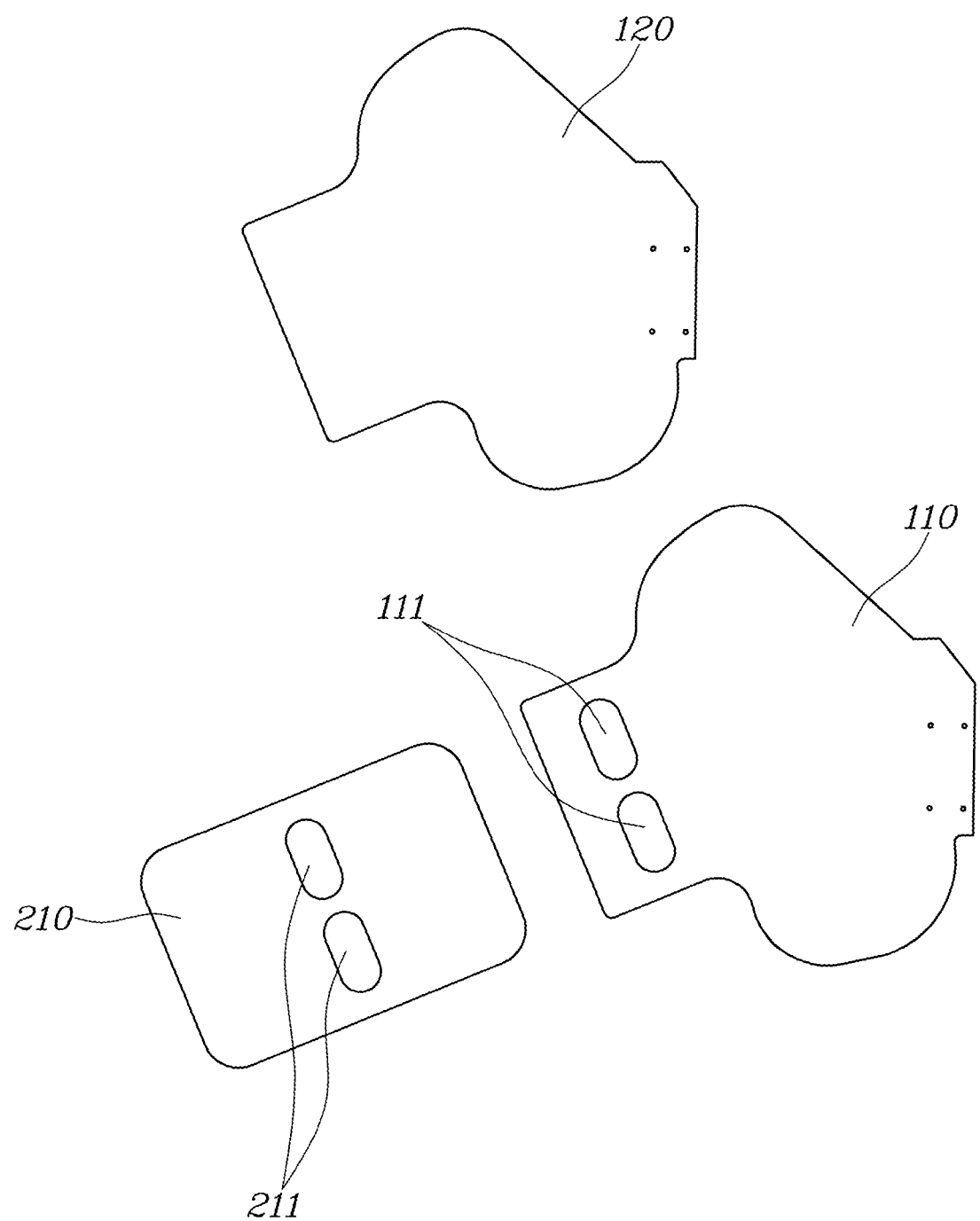
FIGS. 2 to 5 are views for explaining a process of manufacturing a lateral cushion and a front cushion according to the present invention.

As illustrated in FIG. 2, the inner cushion part 110, the outer cushion part 120, and the raw cushion fabric 210 provided as a single panel are prepared. One or more inner cushion part holes 111 (i.e., first holes) are formed in a front portion of the inner cushion part 110, and one or more raw cushion fabric holes 211 (e.g., second holes) are formed in the raw cushion fabric 210.

Figure 3:
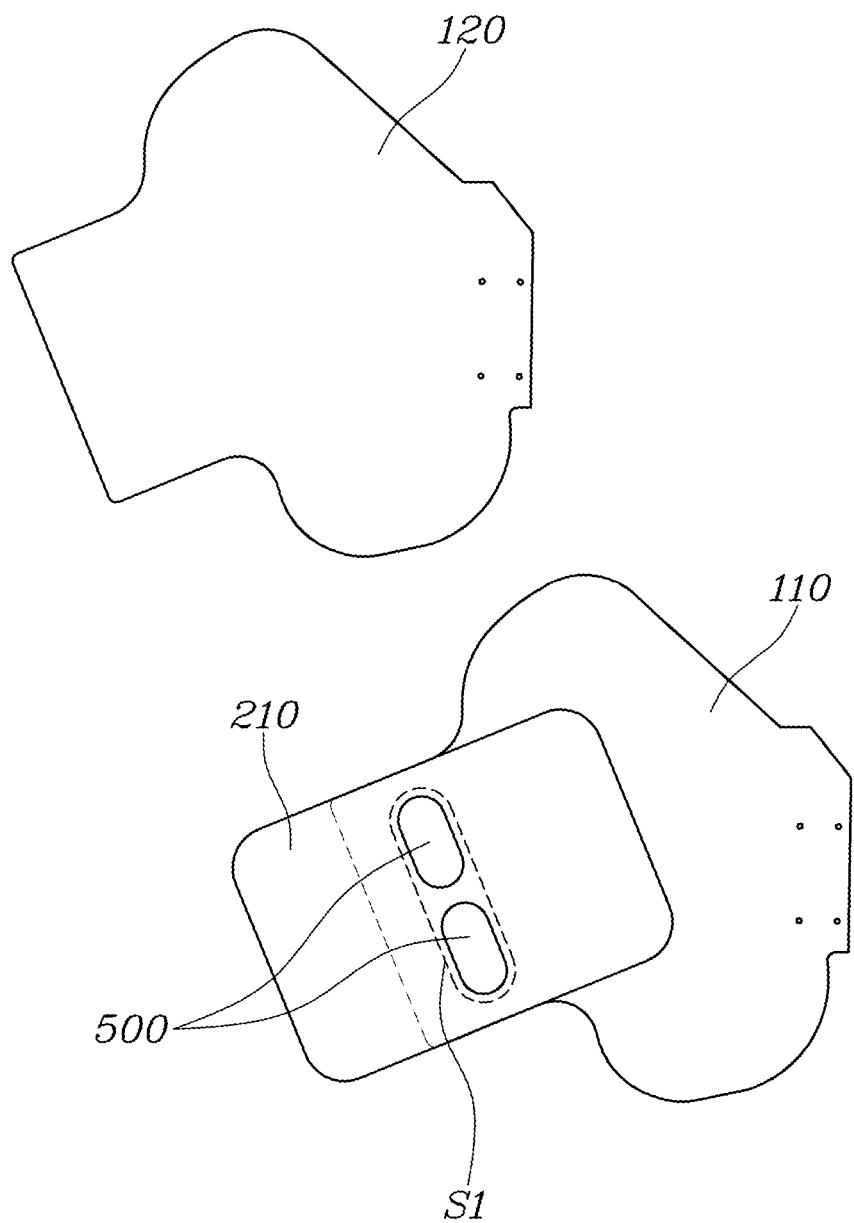

As illustrated in FIG. 3, the inner cushion part 110 and the raw cushion fabric 210 are superimposed, such that the inner cushion part holes 111 and the raw cushion fabric holes 211 are connected to one another.

When the inner cushion part holes 111 and the raw cushion fabric holes 211 are connected to one another, vent holes 500 for connecting the lateral cushion 100 and the front cushion 200 are defined. The airbag gas is transmitted from the lateral cushion 100 to the front cushion 200 through the vent holes 500.

When the vent holes 500 are defined as the inner cushion part holes 111 and the raw cushion fabric holes 211 are connected to one another, an outer periphery of the vent holes 500 is sewn (S1). As the outer periphery of the vent hole 500 is sewn (S1), the inner cushion part 110 and the raw cushion fabric 210 are coupled to each other, and thus the lateral cushion 100 and the front cushion 200 are coupled to each other.

A seat airbag apparatus in the related art has a structure in which a cylindrical front cushion is coupled to a lateral cushion by sewing. That is, in the related art, the cylindrical front cushion is coupled to the lateral cushion by sewing after a coupled portion between the cylindrical front cushion and the lateral cushion is bent outward. However, the sewn portion of the front cushion bent outward is not uniform, which makes it difficult to apply uniform sewing to a predetermined position of the lateral cushion. For this reason, it is difficult to maintain a constant sewing interval, which makes it difficult to manufacture the airbag apparatus. In particular, tolerance in respect to the sewing is high, which may degrade quality.

In contrast, according to the embodiment of the present invention, the raw cushion fabric 210 provided in the form of a single flat panel is coupled by sewing to the inner cushion part 110 provided in the form of a flat panel, and the front cushion 200 is formed by using the raw cushion fabric 210 provided in the form of a flat panel. Therefore, the sewing coupling may be easily and smoothly performed, and particularly the tolerance in respect to the sewing coupling may be reduced, thereby improving quality.

In addition, according to the present invention, when the structure in which the lateral cushion 100 and the front cushion 200 are connected to each other is made by sewing the raw cushion fabric 210 and the inner cushion part 110, it is possible to solve a structural problem in that the front cushion 200 is deployed while being bent from the lateral cushion 100. Therefore, the airbag gas may be smoothly transmitted to the front cushion 200, thereby improving performance in deploying the cushion.

Figure 4:
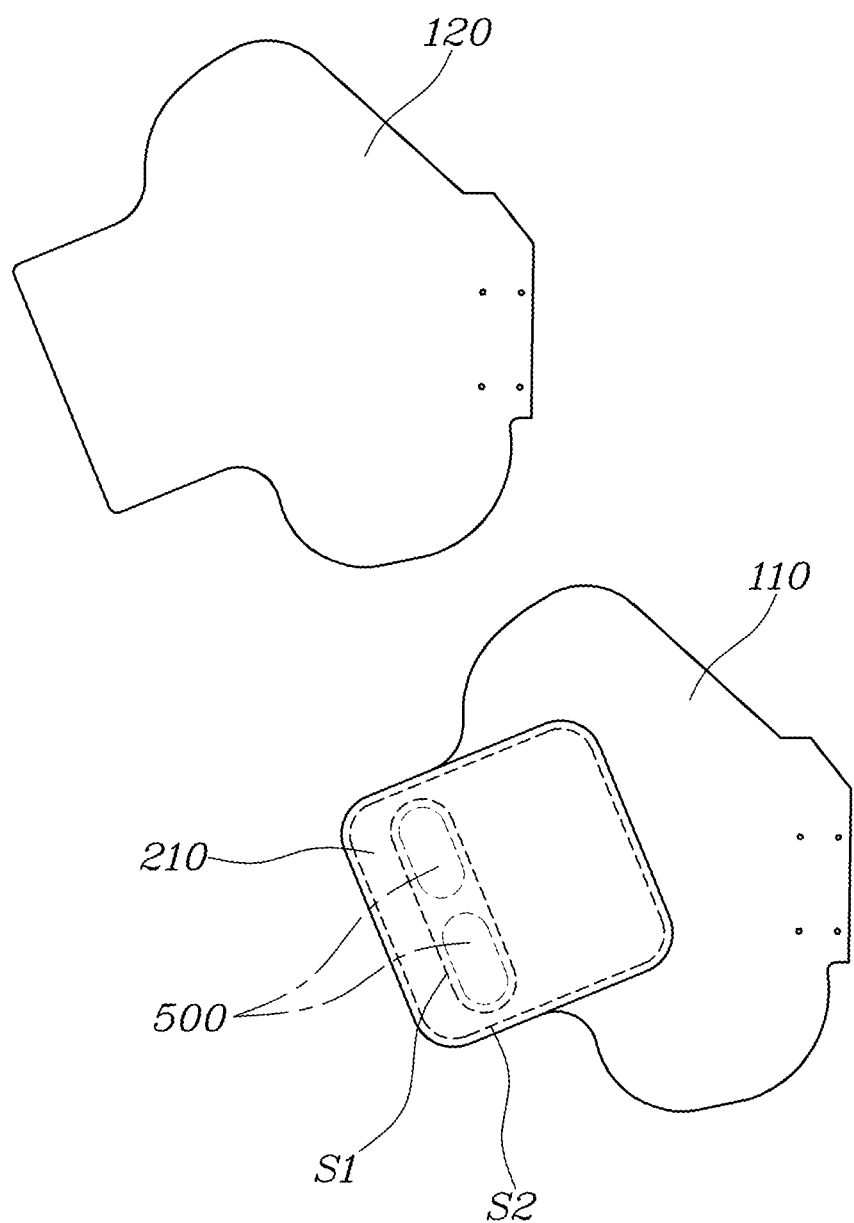

When the inner cushion part 110 and the raw cushion fabric 210 are coupled to each other as the periphery of the vent holes 500 is sewn (S1), the raw cushion fabric 210 coupled to the inner cushion part 110 is folded in half in a pocket shape, as illustrated in FIG. 4, and an outer peripheral rim of the folded raw cushion fabric 210 is sewn (S2). Therefore, the front cushion 200 is formed by the raw cushion fabric 210 in the form of a single flat panel.

Figure 5:
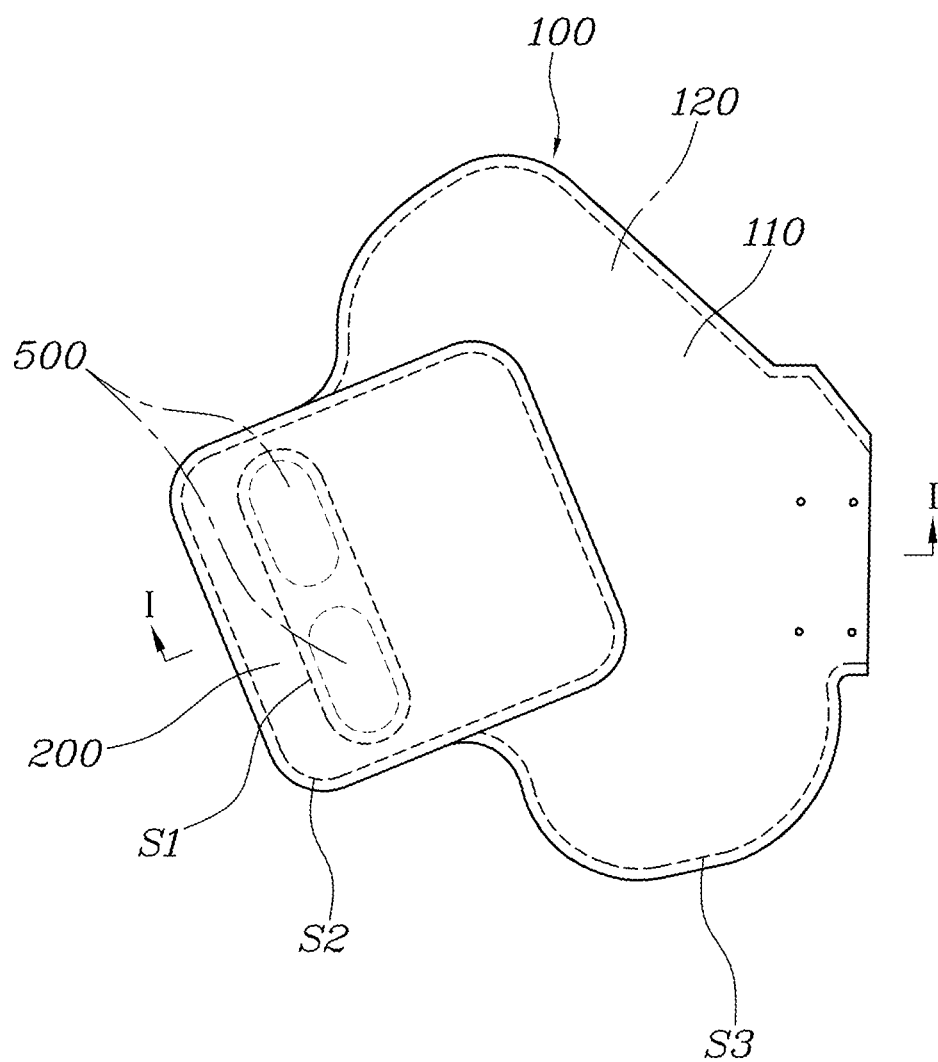
Figure 6:
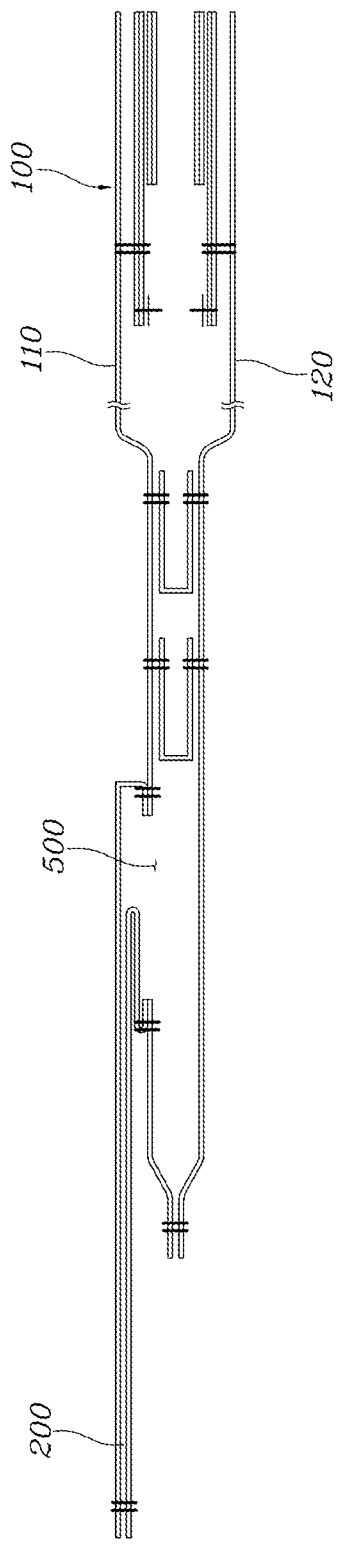
FIG. 6 is a cross-sectional view taken along line I-I in FIG. 5

As illustrated in FIG. 5, when the front cushion 200 is formed by the raw cushion fabric 210, the outer cushion part 120 is superimposed on the inner cushion part 110, and an outer peripheral rim of the inner cushion part 110 and an outer peripheral rim of the outer cushion part 120 are sewn (S3). As a result, the lateral cushion 100 is formed.

The interior of the lateral cushion 100 and the interior of the front cushion 200 are connected to each other through the vent holes 500, and the periphery of the vent hole 500 is sewn (S1). Therefore, the lateral cushion 100 and the front cushion 200 are coupled to each other.

Meanwhile, the vent hole 500 may be enlarged by pressure of the airbag gas when the airbag gas generated by an inflator by an operation of the airbag apparatus is transmitted from the lateral cushion 100 to the front cushion 200 through the vent hole 500. When the vent hole 500 is enlarged, the performance in deploying the front cushion 200 deteriorates.

Figure 7:
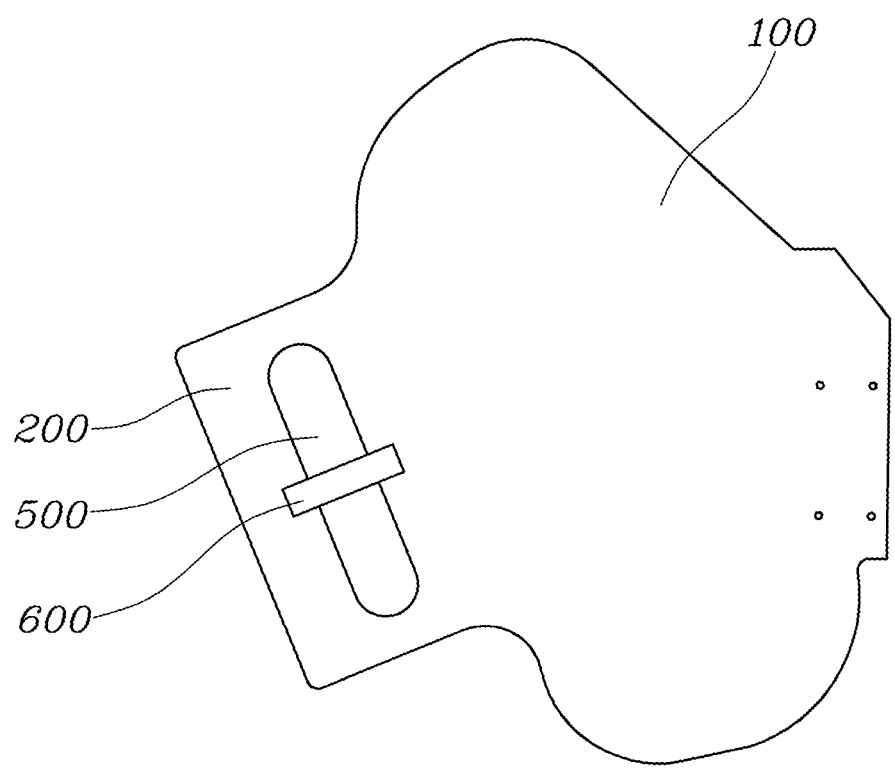
FIGS. 7 to 8 are views illustrating embodiments according to the present invention for preventing a vent hole from being enlarged.

According to the embodiment of the present invention, a tether 600 is extending across the vent hole 500 in order to prevent the vent hole 500 from being enlarged, as illustrated in FIG. 7. Therefore, a high restrictive force of the tether 600 may prevent the vent hole 500 from being enlarged.

The tether 600 is applied to the vent hole 500 when the vent hole 500 is a single hole large in size.

Figure 8:
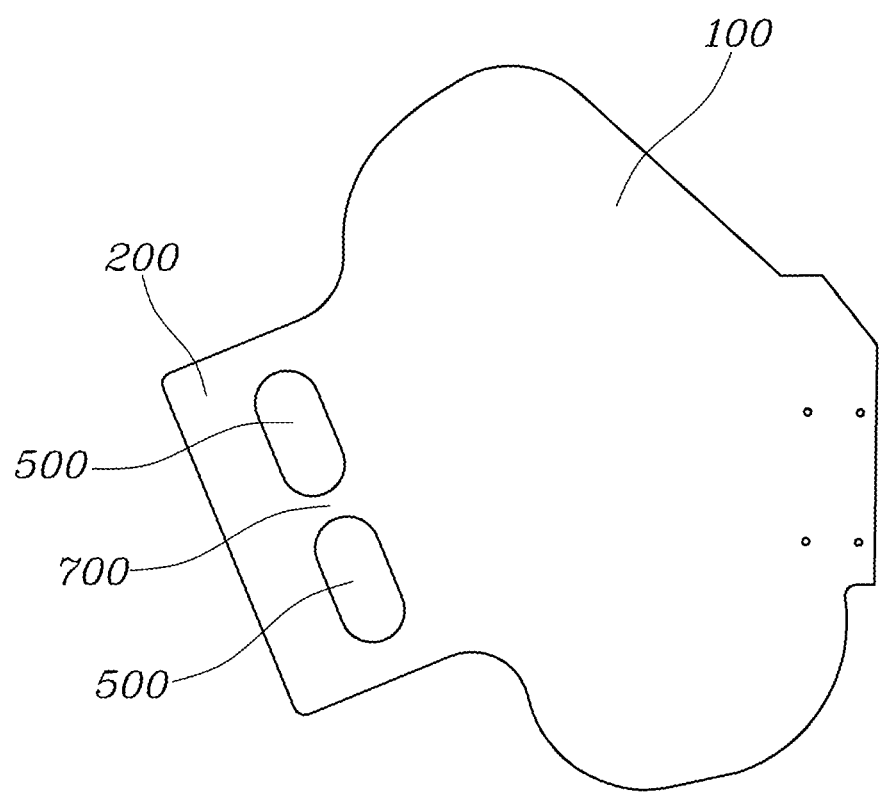

As another example, as illustrated in FIG. 8, two or more vent holes 500 may be provided, and a connection portion 700 extending between the vent holes 500 may be used to prevent the vent holes 500 from being enlarged when the airbag gas is transmitted.

According to the seat airbag apparatus for a vehicle according to the embodiment of the present invention described above, the lateral cushions 100 are deployed while protruding forward from the seatback 10 to protect the lateral sides of the passenger 20, and the front cushions 200 are deployed while protruding toward the front side of the passenger 20 from the lateral cushions 100 to protect the front side of the passenger 20. The seat airbag apparatus may be applied to the autonomous vehicle in which the movement and rotation of the seat and the passenger's seating conditions are variously changed. In particular, it is possible to more effectively protect the passenger 20 in the autonomous vehicle.

In addition, according to the embodiment of the present invention, the raw cushion fabric 210 provided in the form of a single flat panel is coupled by sewing to the inner cushion part 110 provided in the form of a flat panel, and the front cushion 200 is formed by using the raw cushion fabric 210 provided in the form of a flat panel. Therefore, the sewing coupling may be easily and smoothly performed, and particularly the tolerance in respect to the sewing coupling may be reduced, thereby improving quality.

In addition, according to the present invention, since the structure in which the lateral cushion 100 and the front cushion 200 are connected to each other is made by sewing the raw cushion fabric 210 and the inner cushion part 110, it is possible to solve a structural problem in that the front cushion 200 is deployed while being bent from the lateral cushion 100. Therefore, the airbag gas may be smoothly transmitted to the front cushion 200, thereby improving performance in deploying the cushion.

While the specific embodiments of the present invention have been illustrated and described, it will be obvious to those skilled in the art that the present invention may be variously modified and changed without departing from the technical spirit of the present invention defined in the appended claims.

What is claimed is:

1. A seat airbag for a vehicle, comprising:
   a lateral cushion including:
      an inner part configured to face in a first direction toward a passenger when the lateral cushion is deployed;
      an outer part superimposed with the inner part and configured to face in a second direction opposite to the first direction when the lateral cushion is deployed, wherein an outer periphery of the outer part is coupled to that of the inner part; and
      a first inner space between the inner and outer parts, wherein the lateral cushion is configured to inflate and cover a side of the passenger when airbag gas is supplied to the first inner space; and
   a front cushion having a second inner space connected to the first inner space of the lateral cushion and configured to inflate and cover a front of the passenger when the airbag gas is supplied to the second inner space,
   wherein an outer periphery of a front portion of the lateral cushion is coupled to an outer periphery of the front cushion,
   wherein the front cushion includes a raw cushion fabric provided in a form of a flat panel, and
   wherein the raw cushion fabric is folded in a pocket shape and is coupled to the inner part.

2. The seat airbag of claim 1, wherein the first and second inner spaces of the lateral cushion and the front cushion are connected to each other through one or more vent holes disposed between the lateral cushion and the front cushion.

3. The seat airbag of claim 2, wherein the lateral cushion comprises a tether extending across the one or more vent holes.

4. The seat airbag of claim 2, wherein:
   the one or more vent holes comprise first and second vent holes, and
   the lateral cushion has a connection portion extending between the first and second vent holes.

5. The seat airbag of claim 1, wherein:
   a front portion of the inner part has one or more first cushion holes, and
   the front cushion has one or more second holes respectively aligned with the one or more first cushion holes.

6. The seat airbag of claim 1, wherein:
   a front portion of the inner part has one or more first vent holes, and
   the front cushion has one or more second vent holes respectively aligned with the one or more first vent holes.

7. The seat airbag of claim 6, wherein the inner part has a tether extending across the one or more first vent holes.

8. The seat airbag of claim 6, wherein:
   the one or more first vent holes comprise a pair of the first vent holes, and
   the front portion of the inner part has a connection portion extending between the pair of the first vent holes.

\* \* \* \* \*